Feb. 11, 1930.  U. C. EVANS  1,747,108
ANIMAL TRAP
Filed May 11, 1928

Inventor
UEL C. EVANS
By [signature]
Attorney

Patented Feb. 11, 1930

1,747,108

UNITED STATES PATENT OFFICE

UEL C. EVANS, OF RIGBY, IDAHO

ANIMAL TRAP

Application filed May 11, 1928. Serial No. 276,901.

This invention relates to an animal trap, more particularly to the type of trap which is placed in the path or runs of small animals which are trapped for their furs, such as muskrat, mink, otter, martin, etc.

The principal object of the invention is to provide a trap for this purpose which will trap the animal alive and not injure the fur or pelt.

Another object of the invention is to so construct the trap that the animal can see entirely through it so as not to excite the suspicion usually created by entering a closed space.

Still another object of the invention is to provide a trap which can be placed in the runways or entrances of the pens of fur farms for trapping the live animals as they attempt to pass between the pens.

A further object is to provide a trap which can be readily used to transport or drown the animal.

A still further object is to provide a smooth continuous floor in the trap, without projections of any kind which would arouse the suspicion of the animal and to provide sides for the trap which will readily lend themselves to camouflage with grass, branches, and other material.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

Figure 1:
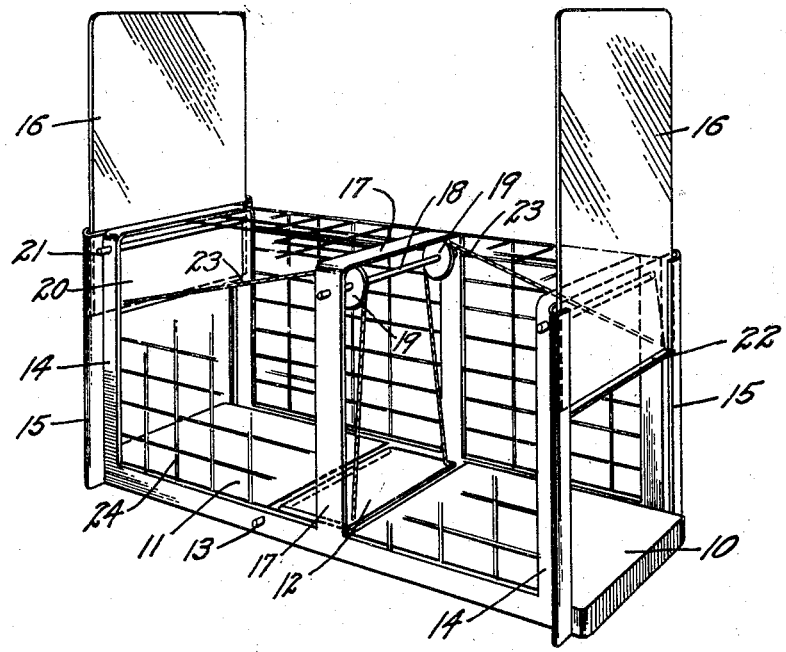
Fig. 1 is a perspective view of my improved trap in the set position.
Figure 2:
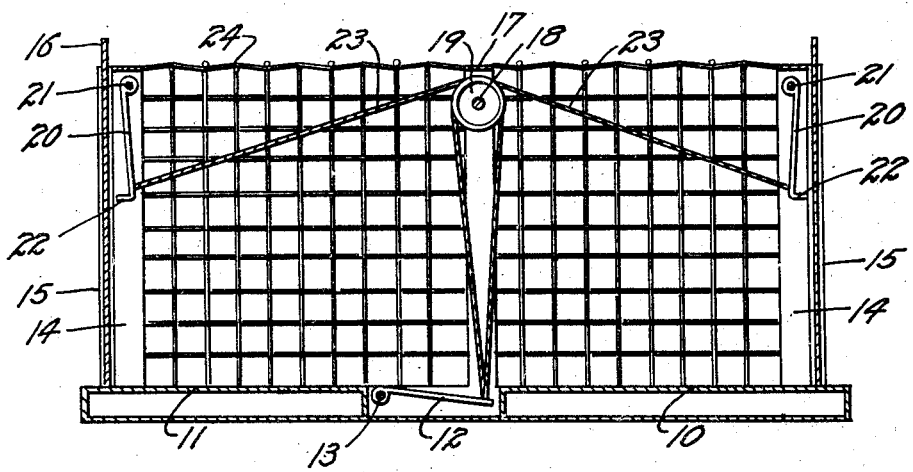
Fig. 2 is a longitudinal section through the trap in the "sprung" or closed position.

The trap comprises two floor portions 10 and 11, separated by a hinged trip plate 12, which is carried on a hinge pin 13. At each extremity of the trap, a door frame 14, is formed, each frame having two inwardly turned door guides 15, which slidably receive gravity-operated, doors 16.

Midway between the door frames 14 a wheel frame 17 is arranged to support a shaft 18, carrying grooved pulleys 19. Immediately back of each of the doors 16 is a door latch plate 20 hinged on a cross pin 21. The latch plates 20 are flanged as shown at 22 so that they pass under and retain the doors in the raised or open position.

Each of the latch plates 20 is connected by means of a wire, cable, or string 23 with the free edge of the trip plate 12. Each of the wires 23 passes over one of the pulleys 19 and connects with the trip plate 12 adjacent its outer edge so as not to obstruct the passageway through the trap. The entire sides and bottom of the trap are covered with suitable wire netting 24.

In use, the trap is placed in an animal run or between the pens of a fur farm and covered with grass, moss or other suitable camouflage. The animal in seeking a passage from the pen or through the camouflage will notice and attempt to pass through the passageway through the trap. In passing, he will depress the trip plate 12 causing the wires 23 to draw the latch plates 20 inwardly, thus simultaneously releasing both doors 16 so that they will fall and completely close the trap.

The trap can then be lifted and the animal carried where desired. The animal may, if desired, be killed without injuring the pelt by immersing the entire trap. The trap is constructed entirely of metal, preferably galvanized, so that it will be weather proof and cannot be gnawed and chewed by the animal.

When the trap is in the set position of Fig. 1 the trip plate 12 is in perfect alignment with the two floor sections 10 and 11 so that it is not noticeable and will not arouse the suspicion of the animal. The trap can be made any desired size, depending upon the particular animals for which it is to be used, and will be found valuable for trapping live animals for zoos, etc. Bait can be hung from the shaft 18 when found necessary.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. An animal trap comprising: an enclosure open at its two extremities; vertical sliding doors adapted to close said two extremities; two spaced apart floor sections forming a bottom for said enclosure; a hinged trip plate positioned between said two floor sections; a shaft extending across said enclosure adjacent each of said extremities; a latch plate hanging from each of said shafts; a forwardly turned flange on each of said latch plates, said shafts being positioned so that said flange will swing under said doors and support the same over their entire width; and an operable connection between said hinged trip plate and said hanging latch plates so as to draw the latter inwardly when the former is depressed and withdraw said flanges from under said doors.

2. An animal trap comprising: an enclosure open at its two extremities; vertical sliding doors adapted to close said two extremities; two spaced apart floor sections forming a bottom for said enclosure; a hinged trip plate positioned between said two floor sections; a shaft extending across said enclosure adjacent each of said sides; a latch plate hanging from each of said shafts; a forwardly turned flange on each of said latch plates, said shafts being positioned so that said flange will swing under said doors and support the same over their entire width; a shaft extending across said enclosure substantially above said trip plate; pulleys adjacent the extremities of said shaft; and a flexible medium connected with the free edge of said trip plate adjacent the walls of said enclosure and passing over said pulleys to a connection with said latch plates adjacent the walls of said enclosure.

In testimony whereof, I affix my signature.

UEL C. EVANS.